W. W. PLOWMAN.
HITCH STRAP HOLDER.
APPLICATION FILED MAY 20, 1908.
919,947.
Patented Apr. 27, 1909.
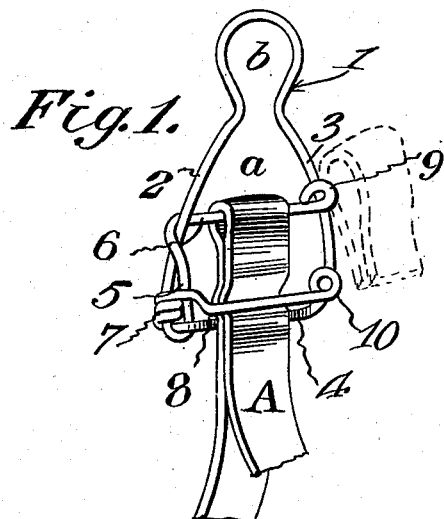
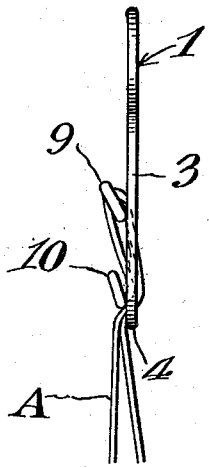
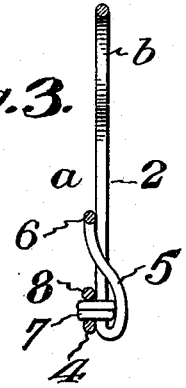
Witnesses:
Joe. P. Wahler.
C. Bradway.
Inventor
William W. Plowman.
By Victor J. Evans.
Attorney

UNITED STATES PATENT OFFICE.

WILLIAM W. PLOWMAN, OF JEWELL, KANSAS.

HITCH-STRAP HOLDER.

No. 919,947.  Specification of Letters Patent.  Patented April 27, 1909.

Application filed May 20, 1908. Serial No. 433,876.

*To all whom it may concern:*

Be it known that I, WILLIAM W. PLOWMAN, a citizen of the United States, residing at Jewell, in the county of Jewell and State of Kansas, have invented new and useful Improvements in Hitch-Strap Holders, of which the following is a specification.

This invention relates to a hitch strap holder adapted to be fastened to the harness or the manger of a stall, post or other support and is so designed that a hitch strap can be fastened therein without requiring the strap to be tied.

The invention has for one of its objects to provide a device of this character which is of comparatively simple and inexpensive construction, having great holding power and so designed as to permit the strap to be readily fastened or removed.

The invention comprises the various novel features of construction and arrangement of parts which will be more fully described hereinafter and set forth with particularity in the claim appended hereto.

In the accompanying drawing, which illustrates one of the embodiments of the invention, Figure 1 is a perspective view of the holder showing a hitch strap applied thereto. Fig. 2 is a side view thereof. Fig. 3 is a central vertical section of the holder.

Similar reference characters are employed to designate corresponding parts throughout the views.

Referring to the drawing, 1 designates the wire from which the holder is formed, the wire being of steel or other material of suitable gage and stiffness. The wire is bent into a main loop $a$ forming the body of the holder and a secondary loop $b$ receiving a staple, hook or other fastener whereby the holder is secured to a support. The body $a$ consists of oppositely-curved side members 2 and 3, and a cross member or bar 4 connected with the side member 3. The lower end of the member 2 is doubled around one end of the bar 4 and bent upwardly and outwardly into a connecting member 5 that extends across the member 2 and has connected therewith a keeper or cross bar 6 that extends under the member 2 and has its free end disposed over the front of the cross bar 3. The wire continues from the end of the cross bar 4 and is coiled around the lower end of the member 2 at 7, and the extremity of the wire is formed into a spring bar or keeper 8 that extends parallel between the bars 4 and 6, and has its free extremity disposed over the member 3. The terminals of the bars 6 and 8 are formed into loops 9 and 10, respectively, which are inclined upwardly and outwardly from the plane of the body $a$, as shown in Fig. 2, so as to facilitate the insertion of the hitching strap.

In applying the hitching strap A, the free end thereof is doubled or looped and the loop is first applied over the extremity 9 of the spring bar 6, as shown by dotted lines in Fig. 1. The loop of the strap straddles the bar 6 and is worked under the latter and between the bar or member 3. While the strap is partially inserted over the bar 6, the double thickness of the strap is worked under the extremity 10 of the spring clamping bar 8, the inclinations of the extremities 9 and 10 serving to permit the strap to be wedged between the bars 6 and 8 and member 3 so that the insertion will be accomplished with facility. After being thus partially inserted, it merely remains to push the strap farther against the holder until it assumes the position shown in full lines, Fig. 1. The bars 4 and 6 serve to kink the looped strap and they coöperate with the bar 8 to take the strain and prevent the strap from slipping when tension is exerted on the strap.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what I claim is:—

A device of the class described comprising a single piece wire structure formed into a main loop and a secondary loop, the main loop consisting of side members and a cross bar, the cross bar being connected with the ends of the side members opposite to the ends connected with the secondary loop, a coil connected with one extremity of the cross bar and wound around one side member, a spring bar connected with the coil and extending across the loop and parallel with the cross bar with its free extremity disposed over the front of the opposite side member of the main loop, a spring bar disposed parallel with the first-mentioned bar and extending from one side member to the other and disposed parallel with the first-mentioned spring bar, and a connecting member uniting the second-mentioned spring bar with the member of the loop on which the said coil is wound and extending inwardly and upwardly around the cross bar and outwardly around the side member above the coil thereon.

In testimony whereof I affix my signature in presence of two witnesses.

WILLIAM W. PLOWMAN.

Witnesses:
N. W. CLARK,
F. E. RUGGLES.